(12) United States Patent
Karcher et al.

(10) Patent No.: US 7,640,691 B2
(45) Date of Patent: Jan. 5, 2010

(54) DUAL SIGHT SCOPE SYSTEM AND METHOD

(76) Inventors: Philip B Karcher, c/o Vitronics Inc., 3 Corbett Way, Eatontown, NJ (US) 07724; John D. Hunt, c/o Vitronics Inc., 3 Corbett Way, Eatontown, NJ (US) 07724; Mark R. Holder, c/o Vitronics Inc., 3 Corbett Way, Eatontown, NJ (US) 07724

( * ) Notice: Subject to any disclaimer, the term of this patent is extended or adjusted under 35 U.S.C. 154(b) by 275 days.

(21) Appl. No.: 11/001,485

(22) Filed: Dec. 1, 2004

(65) Prior Publication Data

US 2005/0241210 A1 Nov. 3, 2005

Related U.S. Application Data

(60) Provisional application No. 60/543,707, filed on Feb. 11, 2004.

(51) Int. Cl.
*F41G 1/40* (2006.01)
(52) U.S. Cl. .................... 42/118; 359/399; 359/618
(58) Field of Classification Search ............. 356/247; 359/618; 42/118
See application file for complete search history.

(56) References Cited

U.S. PATENT DOCUMENTS

| 708,720 | A | * | 9/1902 | Koenig | 359/402 |
|---|---|---|---|---|---|
| 1,264,133 | A | * | 4/1918 | Morris | 42/118 |
| 3,575,085 | A | | 4/1971 | McAdam, Jr. | |
| 3,734,627 | A | * | 5/1973 | Edwards | 356/153 |
| 3,798,796 | A | * | 3/1974 | Stauff et al. | 434/20 |
| 4,290,219 | A | * | 9/1981 | Boller et al. | 42/106 |
| 4,346,995 | A | | 8/1982 | Morris | |
| 4,749,271 | A | | 6/1988 | Nagler | |
| 4,859,029 | A | * | 8/1989 | Durell | 359/629 |
| 5,035,472 | A | * | 7/1991 | Hansen | 359/350 |
| 5,189,555 | A | | 2/1993 | Jörlöv | |
| 5,694,202 | A | | 12/1997 | Mladjan et al. | |
| H1891 | H | * | 10/2000 | McClenahan et al. | 434/19 |
| 6,311,424 | B1 | * | 11/2001 | Burke | 42/118 |
| 6,490,060 | B1 | | 12/2002 | Tai et al. | |
| 6,643,969 | B1 | * | 11/2003 | Avizonis, Jr. | 42/118 |
| 2005/0132631 | A1 | * | 6/2005 | Bodo | 42/118 |

FOREIGN PATENT DOCUMENTS

DE 4003789 A1 * 9/1990

* cited by examiner

*Primary Examiner*—Michael Carone
*Assistant Examiner*—Jamie Kucab
(74) *Attorney, Agent, or Firm*—Jacox, Meckstroth & Jenkins

(57) ABSTRACT

A dual sighting optical sight is provided. The sight provides non-inverted images through a rear window and at least one side window so that a user may view a target from either a rear or a side, respectively, of the weapon to which the sight is mounted. The sight is adjustable to a plurality of different positions so that the user can use the sight and weapon from other than directly behind the sight weapon.

9 Claims, 10 Drawing Sheets

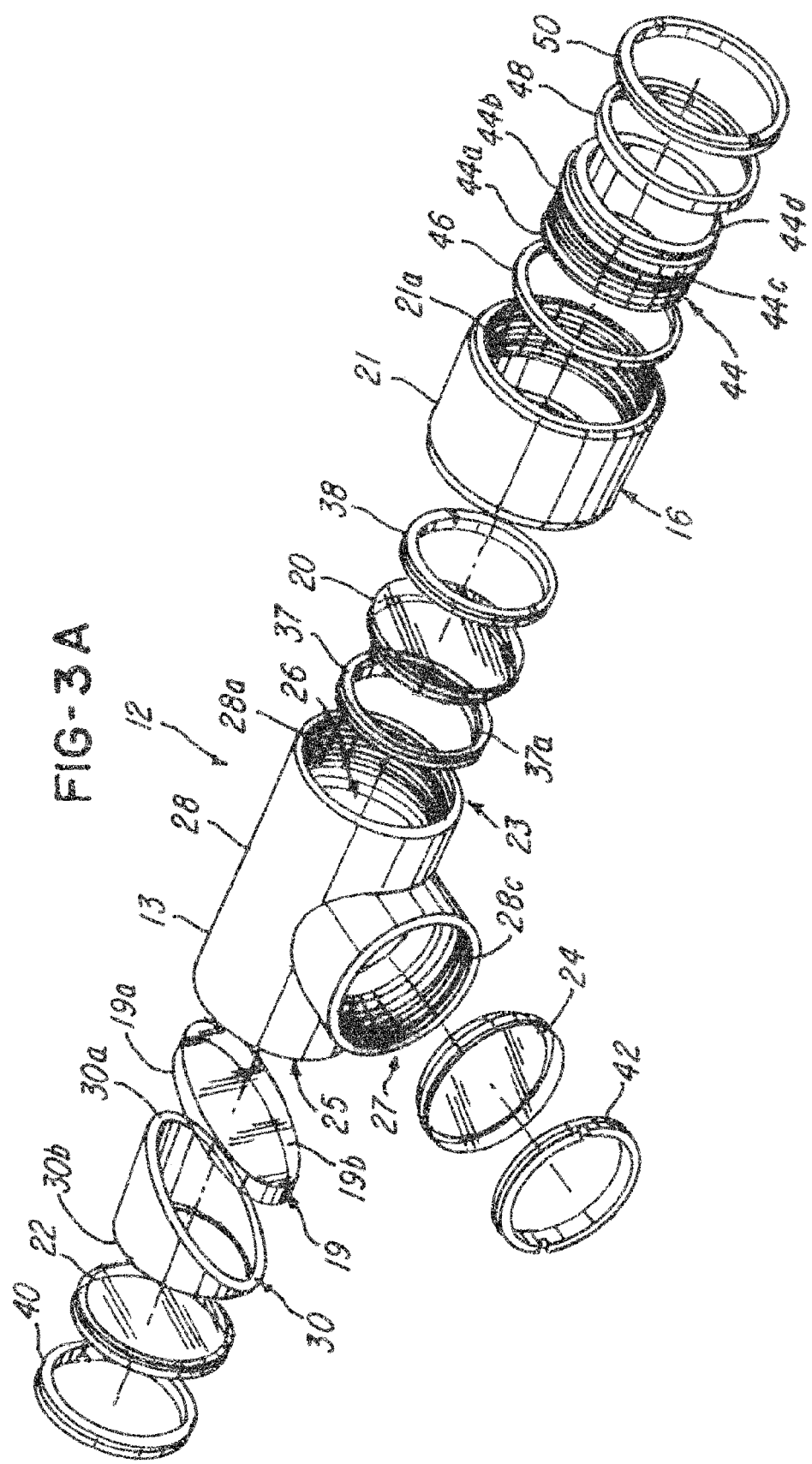

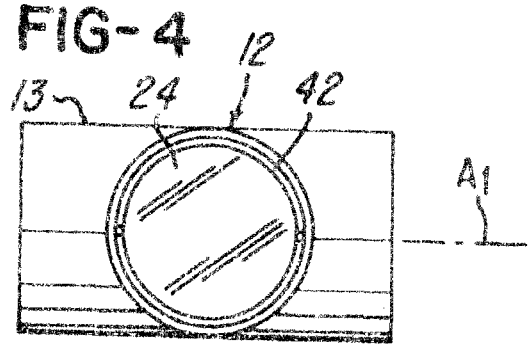
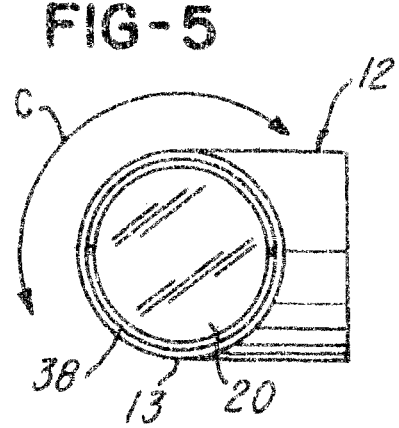
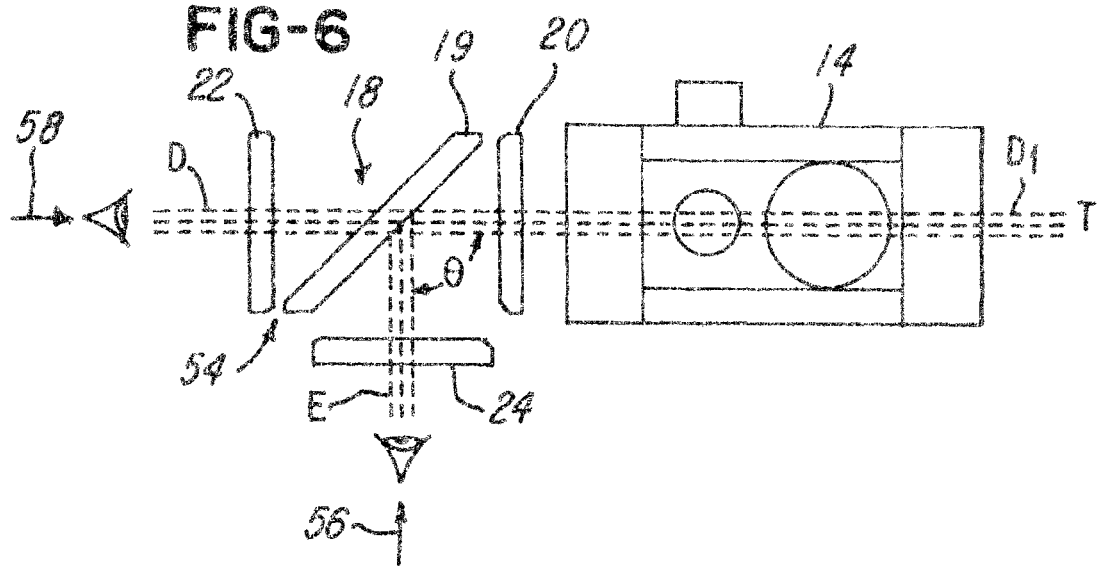

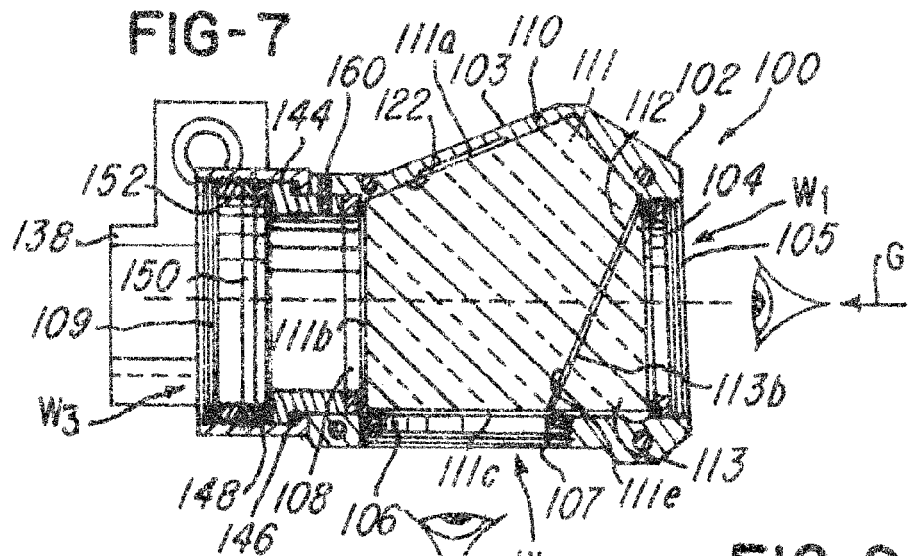

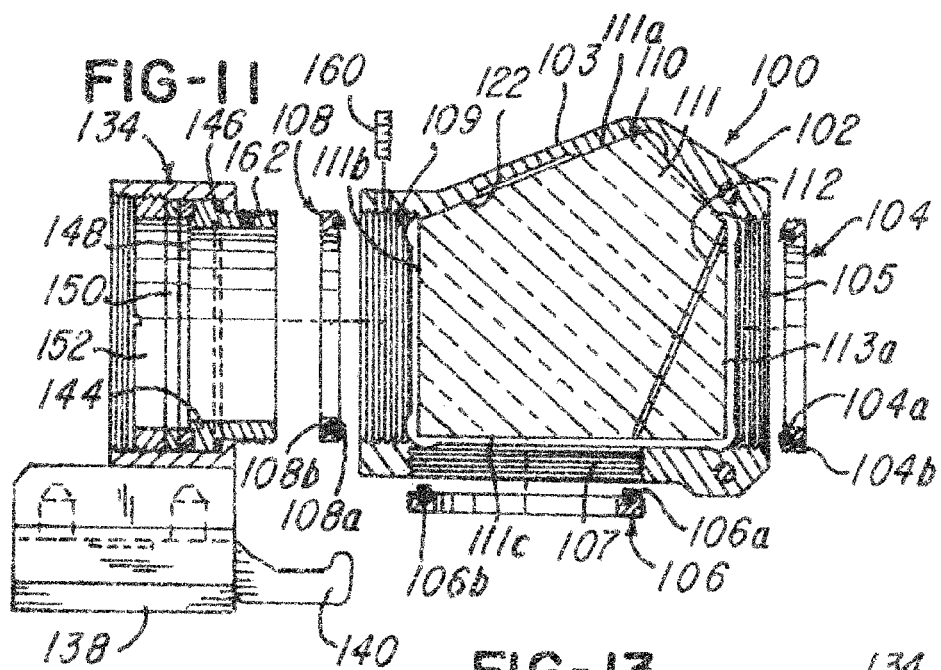
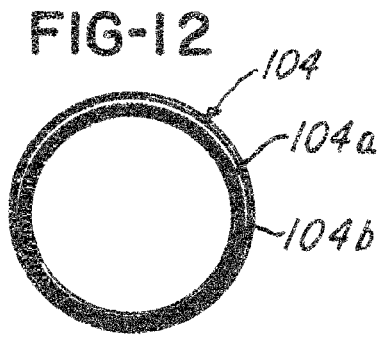
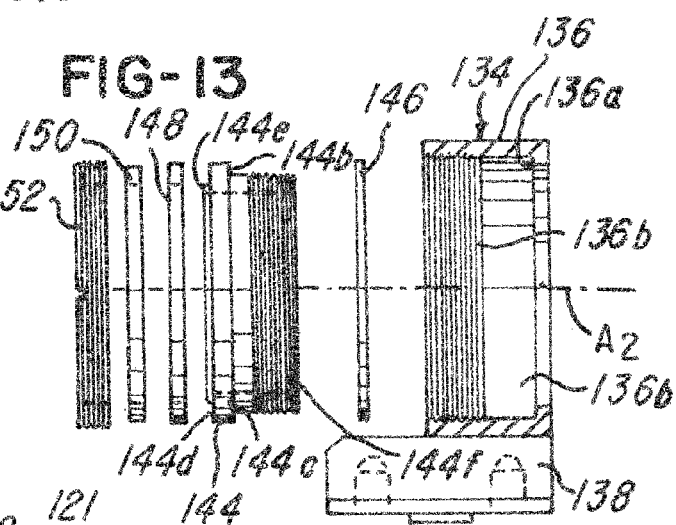
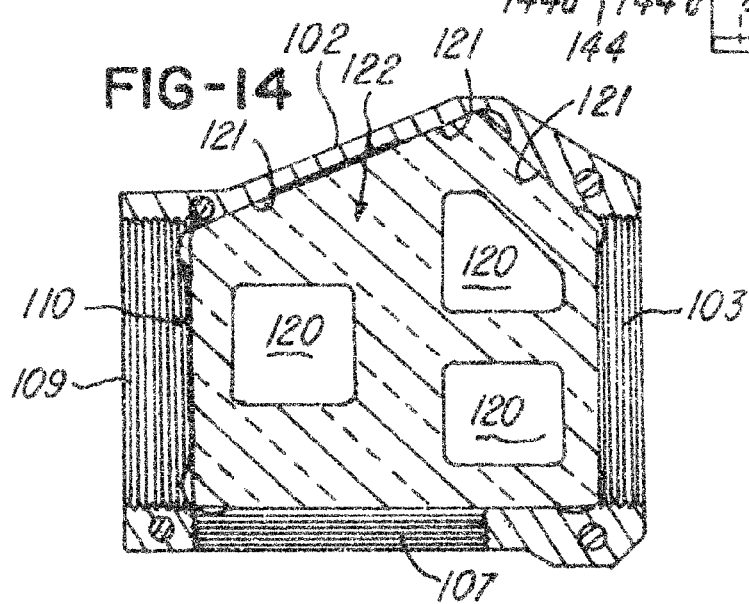

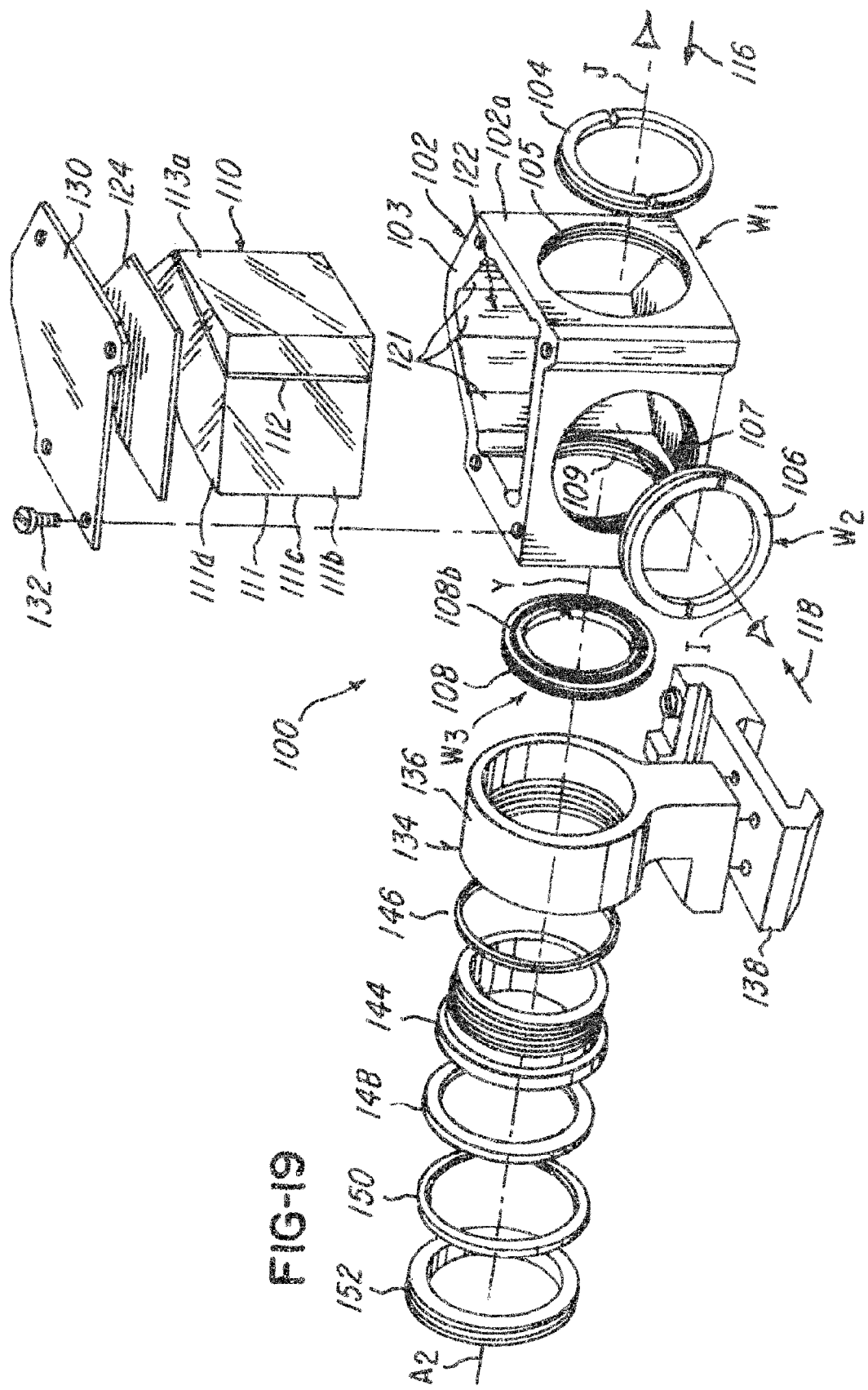

DUAL SIGHT SCOPE SYSTEM AND METHOD

CROSS-REFERENCE TO RELATED APPLICATIONS

This application claims the benefit of U.S. provisional application Ser. No. 60/543,707 filed Feb. 11, 2004, which is incorporated herein by reference and made a part hereof.

FEDERALLY SPONSORED RESEARCH

The U.S. Government has a paid-up license in this invention and the right in limited circumstances to require the patent owner to license others on reasonable terms as provided for by the terms of DAAB07-02-C-B302 awarded by the Department of Defense.

BACKGROUND OF THE INVENTION

This invention relates to issues associated with urban combat where acquisition and engagement of potential targets often requires close-in viewing and aiming in building interiors.

In the past, a weapon, such as a rifle, may have a scope that enables a user to scan an objective area or target area and engage targets while viewing the target through the scope. Unfortunately, these scopes or gun sights required the user to look through the scope by placing the user's eye at or near the end of the scope and looking through the scope at the target. While doing so, the user exposed himself to direct adversary fire when he was using the scope to view, locate and engage a target.

Various types of optical systems have been used as sighting systems on weapons. Examples of such optical systems can be seen in U.S. Pat. No. 5,694,202 Mladjan et al. and in U.S. Pat. No. 4,749,271 by Nagler. Other U.S. references of interest include U.S. Pat. Nos. 4,346,995; 5,189,555; 6,490,060; and 6,643,969.

What is needed is an improved sighting system which enables an alignment and aim the weapon for firing at the target while concealed and protected from such return fire by, for example, a wall of a building.

SUMMARY OF THE INVENTION

This invention positions an optical beam splitting element, which can be rotated around a centerline of a pointing axis of the weapon. The beamsplitter is sealed in an optical housing containing other optical elements in which part or all of the elements can rotate with the beamsplitter. The beamsplitter splits the incoming optical path, giving the viewer dual sighting capabilities and allowing him to aim from either the rear of the weapon or from an adjustable side position of the weapon. The side aiming position can be adjusted by pivoting or rotating the beamsplitter assembly around a pointing axis of the device so that the user can aim at a variety of side, overhead or underneath positions. In a rifle or gun scope application, the beamsplitter is positioned behind the targeting reticle and therefore, the aim point of impact is not compromised by small misalignments of the rotating beamsplitting element. In addition, when the dual sight is coupled or situated adjacent to a conventional gun sight, any unlimited eye relief inherent in the sight affords greater flexibility in accommodating the position of the gunner's eye relative to the rear and side viewing ports or positions.

The sight device, when mounted on small caliber weapons, will allow a gunner to scan an objective or target area and engage targets around corners or over obstacles, quickly and accurately. The intended result is that the user of the sight can see the target and its surroundings in a line or aim point such as a red dot or similar reticle, for firing at a target while concealed and protected from return fire. The sight may be provided with a quick release mount that is compatible with standard gun mounting rails and can be interfaced with red dot, holographic and other types of sighting devices.

It is an object of the invention to provide an improved sighting device that enables viewing a target from rear and side positions.

Another object is to provide a penta prism beamsplitter that enables viewing a target from multiple positions associated with a weapon.

Another object of the invention is to provide a sight that enables side and rear views of a target wherein the image of the target is not inverted.

Another object of the invention is to provide a sight that can be situated in a detached, but proximate relation to, a scope on a weapon.

Another object of the invention is to provide a sight system and method that enables a user to obtain a view of a target from a position other than the rear of the weapon.

Still another object of the invention is to provide an adjustable optical element whose position may be adjusted to enable a viewing axis or position to be adjusted such that a user can view the target, from positions other than the rear of the sight.

In one aspect this invention comprises a sight comprising a connector for mounting the sight to a weapon, a housing coupled to the connector, the housing having a plurality of windows through which a target may be viewed, and an optical element situated in the housing for receiving a beam in one of the plurality of windows and for splitting the beam into a plurality of optical paths associated with the plurality of windows, respectively.

In another aspect this invention comprises a sight for use on a weapon having a scope, the sight comprising a housing comprising a first window, a second window generally opposed to the first window, and at least one third window, an optical element situated in the housing in operative relationship with the first, second and third windows, the optical element comprising at least one beamsplitter, and a connector for detachably coupling the housing in operative relationship with the scope, the first window being generally opposed to the second window for permitting a direct line of sight of a target through the optical element, and the optical element permitting at least one third window to cooperate with at least one of the first window or the second window to permit a side or right angle view of the target from a position displaced from the direct line of sight of the target.

In still another aspect, this invention comprises sight for use on a weapon, the sight comprising an optical element comprising a beamsplitter for mounting on the weapon, the optical element permitting a first view of a target along a first axis and frame, a first viewing area and a second view of the target along a second axis and frame a second viewing area, the second axis being situated at an angle relative to the first axis and a connector for coupling the optical element to the weapon, the connector permitting the optical element to rotate to permit a position of the second view to be changed, while the sight pointing direction remaining substantially the same In yet another aspect, this invention comprises weapon sight prism for use on a weapon comprising a body comprising a plurality of sides, a beamsplitter integrally formed in the body, a mirror surface formed on the body, the beamsplitter and the mirror surface cooperating to provide a plurality of viewing areas for viewing a non-inverted image of a target.

In still another aspect, this invention comprises a sight for use on a weapon or sighting device having a scope, the sight comprising: a housing comprising a plurality of viewing areas, an optical element situated in the housing in operative relationship with the plurality of viewing areas, the optical element comprising at least one beamsplitter, and a connector for detachably coupling the housing to the weapon and in operative relationship with the scope, the plurality of viewing areas and the optical element permitting a view of the target from a rear position of the weapon and a side view of the target from a side position of the weapon.

In yet another aspect, this invention comprises a weapon comprising a firearm for firing bullets at a target, a sight comprising a connector for mounting the sight to the firearm, a housing coupled to the connector, the housing having a first window, a second window and a third window, and an optical element situated in the housing for receiving a beam in first window and for splitting the beam into a plurality of optical paths associated with the second window and the third window.

In still another aspect this invention comprises a shooting method for a user to sight a target providing a weapon comprising a dual sight having a plurality of windows through which the target may be viewed, providing at least one window on a side of the sight, permitting at least one window to be adjusted to enable the user to view the target through the at least one window while positioned behind a barrier.

In yet another aspect, this invention comprises a sight comprising: a housing having a first window, a rear window and a side window, optics located in the housing, and a coupler for coupling the housing to a weapon and for permitting the position of the side window to be adjusted, the optics enabling a user to view an image of a target through the side window and the rear window.

In still another aspect, this invention comprises a dual sight having a front end and a rear end, the dual sight comprising a housing having a first window associated with the front end, a second window associated with the rear end, and a third window; at least one optical element comprising a beamsplitter for splitting light between the second window and the third window so that a target can be viewed through each of them.

Other objects and advantages of the invention will be apparent from the following description and the accompanying drawings.

BRIEF DESCRIPTION OF THE DRAWINGS

FIG. 3A is an exploded view of the embodiment shown in Fig.

FIG. 4 is a view taken in the direction of arrow A in FIG. 3;

FIG. 5 is a view from the direction of arrow B in FIG. 3 and illustrating movement capabilities of an optical element in the direction of double arrow C in FIG. 5;

FIG. 6 is a diagrammatic view, without a housing, illustrating the axis, lines of sight or optical paths D and E;

FIG. 7 is a cross-section fragmentary view of another embodiment of the invention showing a pentaprisim and beamsplitter;

FIG. 8 is a view taken in the direction of arrow F in FIG. 7;

FIG. 9 is a view taken in the direction of arrow G in FIG. 7 and further illustrating the rotational movement of a housing having optical elements therein in the direction of double arrow H in FIG. 9;

FIG. 10 is a view illustrating the axis or lines or sight I and J provided by the optical element of the embodiment shown in FIG. 7;

FIG. 11 is a partially exploded sectional view showing various details of the sight, with sections of glass being separated for ease of illustration;

FIG. 12 is a view of a ring member shown in FIG. 11;

FIG. 13 is an exploded view of a connector and means and apparatus for rotatably coupling an optical housing to the connector;

FIG. 14 is a sectional view of the housing that receives the optical element;

FIG. 19 is an exploded view of an embodiment shown in FIG. 7 illustrating various details of this embodiment.

DETAILED DESCRIPTION OF THE INVENTION

Figure 1:
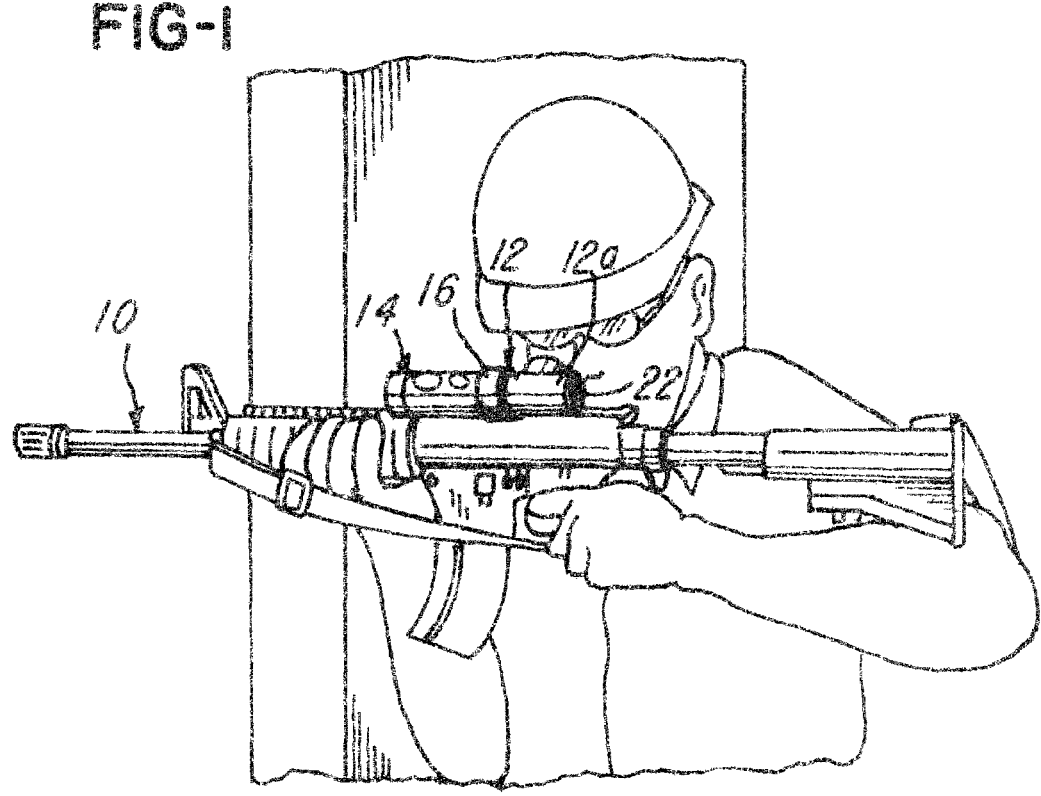
FIG. 1 is a fragmentary view of an embodiment of the invention, illustrating a viewer viewing a target from side of a weapon.

Referring now to FIGS. 1-6, a first embodiment of the invention is shown. In this embodiment, a weapon 10 is held by a user and has a sight 12 that enables a user to view a target from a plurality of different positions, such as a right side position of the weapon 10 (FIG. 1) or a left side position of the weapon 10 (FIG. 2) or numerous other positions therebetween. The sight 12 has a rear window or port, described later herein, located at an end 12a to enable the user to look through the sight 12 in a traditional rear-view position.

The sight 12 is mounted on the weapon 16 with a connector 16 (FIGS. 1-3A) adjacent scope 14. It should be understood that the sight 12 may be used either with or without the scope 14. In the embodiment being illustrated, the sight 12 has an axis that is generally coaxial with an axis of the scope 14. The sight 12 comprises a housing 13 that houses an optical element or assembly 18 (FIGS. 3 and 3A). In this embodiment, the optical element or assembly 18 comprises an elliptical plate beamsplitter 19 having a first side 19a, a second side 19b and a plurality of ports or windows 20, 22 and 24. The beamsplitter 19 which has a 50/50 splitting ratio. Of course, it should be understood that different split ratios may be used to optimize different wave length ranges depending upon the imaging requirements of the environment.

The plurality of ports or windows 20, 22 and 24 are received in areas 23, 25 and 27, respectively, in a housing wall 28. A plurality of locking-ring seals 38, 40 and 42 are threadably received in mating threads 28a, 28b (FIG. 3) and 28c (FIG. 3A) in a housing wall 28 that defines the generally T-shaped housing 13, retain windows 20, 22 and 24 in housing 13 and seal an interior area 26 (FIG. 3A) within a housing wall 28 of housing 13 from moisture, dust and dirt of the type typically encountered in a tactical environment.

The sight 12 (FIG. 3) may be incorporated directly into a riflescope, such as scope 14, as one complete unit or constructed separately and added or retrofitted to a weapon using, for example, a detachable mount (not shown), such as a standard machined Picantinny Rail 1913 Mount or similar mount.

In the embodiment being described, the windows 20-24 may be polished glass flats that have anti-scratch and anti-reflection coating on them to avoid unwanted light reflections, and they do not magnify the image. However, the windows 20-24 could be provided with magnification power if desired. The optical element 18 is mounted in housing 13, and the beamsplitter side 19a is situated against surface 30a which orients the beamsplitter 19 at an approximate 45 degree angle relative to the objective optical path (labeled A1 in FIG. 3). This arrangement causes incoming light to be split and directed to window 24, while some light passes through to window 20. The tubular member 30 has a seat 30a (FIG. 3A) for receiving and supporting window 22. A locking ring 37 is threadably received in housing 13 and has an optical seat 37a is provided for receiving and supporting the window 20. The housing wall 28 has a machined seat 28e for receiving window 24. As mentioned earlier, notice that the windows 20, 22 and 24 are secured to housing wall 28 within housing 13 using the threaded locking rings 38, 40 and 42, which are threadably mounted in the internal mating threads 28a, 28b and 28c respectively, in housing wall 28.

As best illustrated in FIG. 5, the housing 13 is rotatable in the direction of double arrow C and about the axis or center line A1 (FIGS. 3 and 4), which allows the user to adjust the non-rear or side aiming position to accommodate viewing a target T (FIG. 6) from different positions or angles relative to axis A1 and around different objects, such as a wall. The rotational adjustment of the sight 12 is accomplished using a connector or connector assembly 16 which will now be described.

As best shown in FIGS. 3 and 3A, the connector 16 comprises a circular wall member 21 that receives an integral plug 44 that has a threaded end 44a that is threaded into mating threads 28d at end 28a of housing 28. A bearing 46, which may be a plastic ring, is placed over end 44a of the internal plug 44 and between a wall 44b of a flange 44c and a flange or wall 21a (FIG. 3) of circular wall member 21 whereupon plug 44 may be screwed into housing 28 as shown in FIG. 3. A bearing 48 is received on a seat 44d of plug 44 and the assemblage is rotatably mounted in circular wall member 21 and held in place by a locking ring 50. The bearings 46 and 48 allow the plug 44 to rotate inside the circular wall member 21 of the connector 16. The plug 44 and housing 13 to pivot or rotate together about axis A1 (FIG. 3) while the circular wall member 21 of the connector 16 remains fixed. Although not shown, note that the internal plug 44 may be fastened or locked to housing 13 using a set screw (not shown) after plug 44 is threadably received in housing wall 28.

As mentioned earlier, the connector 16 may be detachably mounted to the weapon 10 using a machined mount, such as the Picatinny Rail 1913 mount or similar mount mentioned. Alternatively, the connector 16 may be mounted on or adjacent to scope 14, which may have a similar type of mount and may share the same track or rail on the weapon 12. Thus, the optical element 18 can be separate from scope 14 and provided as an add-on or retrofit unit that can be situated adjacent to and optically coupled to the scope 14, as shown. Alternatively, it could be incorporated into the scope 14 as one complete unit or constructed separately in the housing 13, The scope 14 is mounted toward the front of the weapon, as illustrated in FIG. 1, with the circular wall member 21 receiving and covering a portion of the end 14a of scope 14 to keep dust and dirt away from the interface between the sight 12 and scope 14. The scope 14 and sight 12 may be separated so that there is a gap or distance between the front of the optical housing and the rear of the scope, as will be illustrated later herein relative to another embodiment.

FIG. 6 is a diagrammatic view with various parts and the housing 13 removed for ease of illustration. Note that two optical axes or pathways, pathways D and E, are created by the 50/50 beamsplitter 19 to the objective environment 54 as shown. Note that the beamsplitter 19 splits an incoming light beam D1 into the pathways or axes D and E, thereby enabling viewing or the target T from either a non-rear position, such as a side position 56 (illustrated in FIGS. 1, 2, 4 and 6) or a rear view position 58 (illustrated in FIGS. 5 and 6), which is similar to a traditional rear-view position. Note that the optical element 18, such as beamsplitter 19 and supporting optical elements 20 and 22, are generally positioned behind a targeting or aiming reticle (not shown) within the scope 14 so that an aim point of impact is not compromised due to small optical element misalignments.

As mentioned earlier, the beamsplitter 19 split ratio is typically designed to be 50/50 so the light transmission is evenly divided between the two optical axes or paths D and E. However, other split ratios can be accommodated by selecting a different type of beamsplitter 19 or by having, for example, an aluminized or similar coating deposition applied to the optical glass of the beamsplitter 19 during manufacturing.

Figure 2:
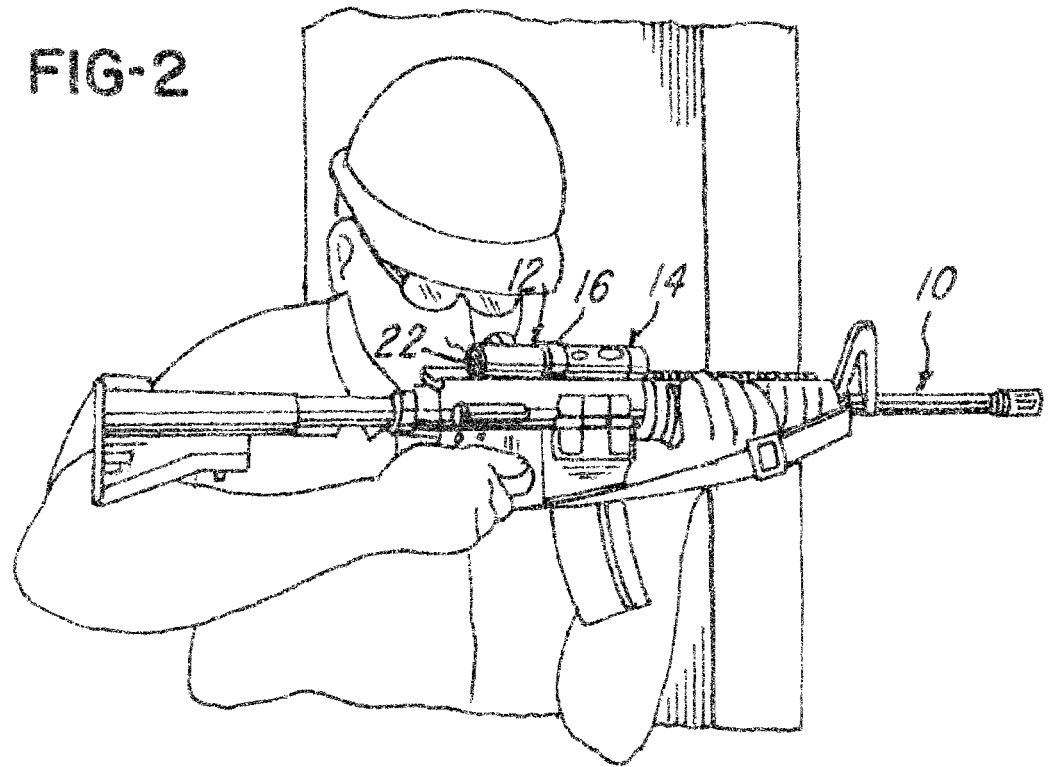
FIG. 2 is a fragmentary view similar to FIG. 1, illustrating a user viewing a target from another side of a weapon side that is opposite the side shown in FIG. 1.
Figure 3:
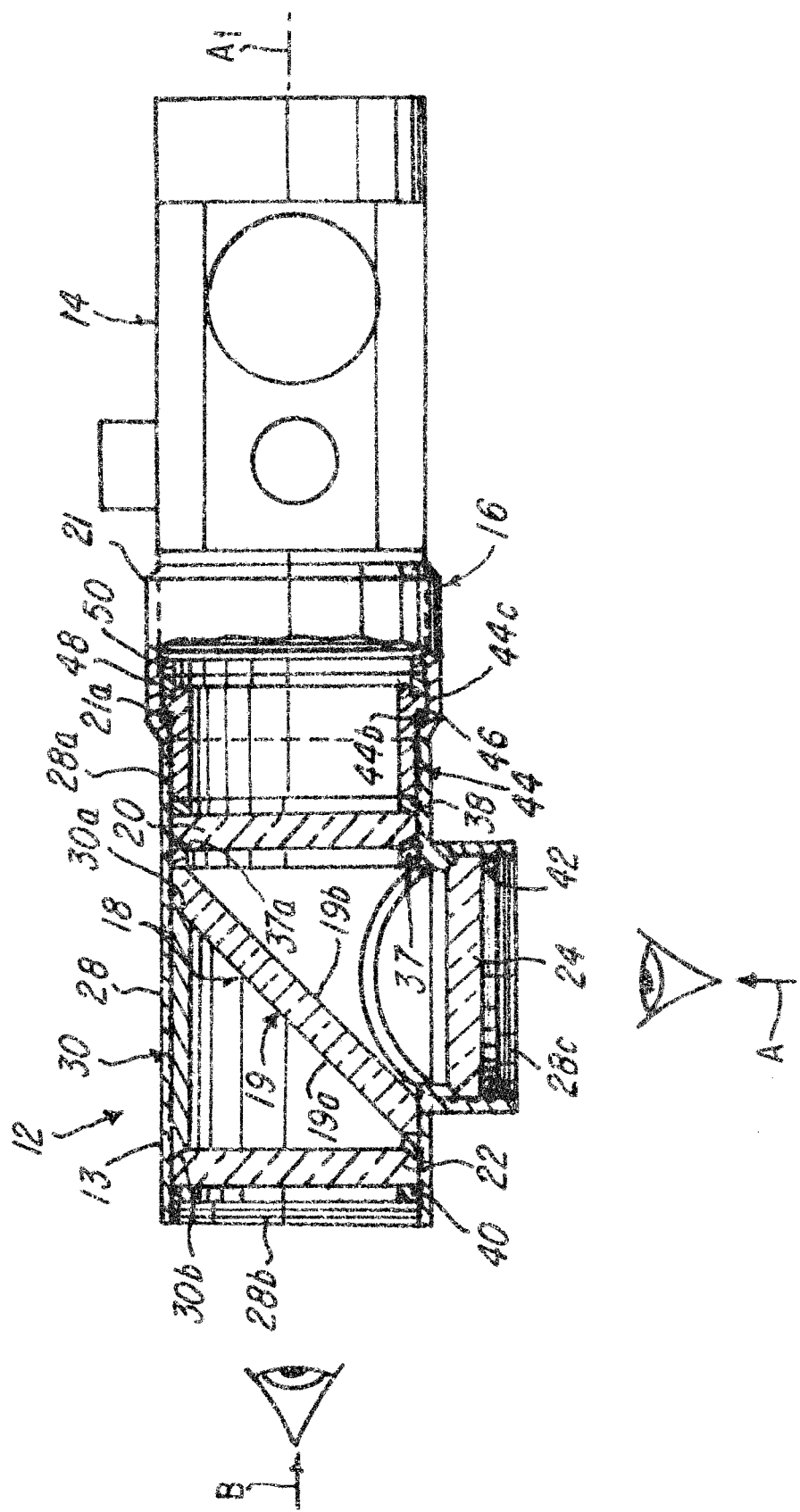
FIG. 3 is a fragmentary sectional view of the embodiment shown in FIG. 1 showing various details of the invention.
Figure 15:
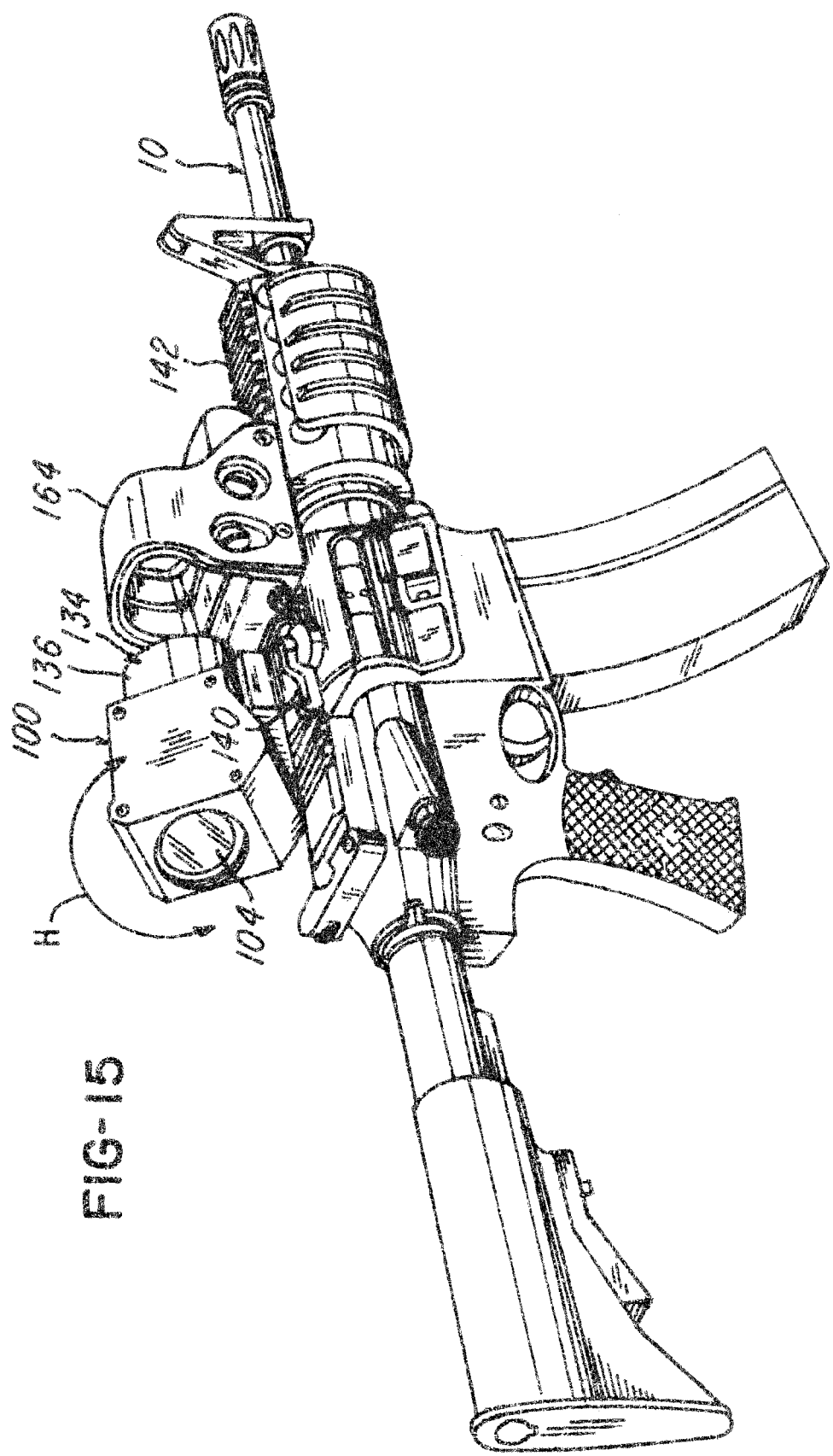
FIG. 15 is a view of a second embodiment showing the operative position of the sight used in association with another sight.

During use, the user may adjust the position of window 24 by pivoting or rotating it about axis A1, in the direction of double arrow C in FIG. 5 to enable the user to view the target from the non-rear position, such as the side positions shown in FIG. 1 or 2 or any position where the user is observing the target T through window 24 and from a direction that is, for example, generally radial to axis A1.

It should be understood that an electronic imaging device may be substituted for the eye in either position 56 (FIGS. 4-6) and 58 (i.e., when viewed from the side or rear, respectively of the weapon 10). For example, a digital camera may be coupled or operatively associated with the windows 22 and 24 if desired. Also, the embodiment may incorporate or be used with night vision, infrared, windage and elevation options of the type previously known Note that the optical path D generally lies in an axis or line that is a direct path or axis through the scope 14 and toward a target T. In contrast, optical path E is situated at a predetermined angle θ relative to the path D and is generally transverse and not co-axial with the optical path D, allowing for multiple viewing positions with a single sight. In the illustration being shown, the predetermined angle is approximately 90 degrees, but it should be appreciated that beamsplitter 19 may be arranged or positioned within housing 13 so that the angle θ is larger or smaller if desired.

The optical element assembly 18, including beamsplitter 19 and windows 20, 22 and 24, do not magnify the image of target T in the embodiment being described. It should be understood, however, that the optical element 18 may be provided with magnification capabilities if desired by providing one or more magnifying lenses separate from or integrated into the windows 20, 22, 24 and/or beamsplitter 18.

Referring now to FIGS. 7 through 19, another embodiment of the invention is shown. In this embodiment, a sight system 100 is shown comprising a housing 102 having a wall 103 having a plurality of threaded openings 105, 107 and 109 that receive locking rings 104, 106 and 108, respectively, as best shown in FIGS. 7, 11 and 19. The locking rings 104, 106 and 108 define or are associated with windows W1, W2 and W3, respectively. The locking rings 104, 106 and 108 are threaded and have O-rings 104*a*, 106*a* and 108*a* that are received in channels 104*b*, 106*b* and 108*b* as illustrated in FIGS. 7, 11 and 12. The purpose and function of the O-ring will be described later herein.

The housing wall 103 is made of high strength aluminum and is configured to define a generally polygonal or pentagonal-shaped receiving area 122 for receiving an optical assembly or element 110. The optical assembly or element 110 comprises a penta prism beamsplitter 111 and an optional wedge cap 113 integrally formed therein in the illustration being described. In the embodiment being described, the optical assembly 110 is comprised of an optional wedge cap 113 and a penta prism beamsplitter 111 comprising a mirror surface 111*a* and beamsplitter surface 112. The beamsplitter surface 112 can be created on a surface 111*e* of penta prism beamsplitter 111 (FIG. 10) or on a wedge cap surface 113*b*, depending on the construction technique used to make the optical assembly 110. However, for purposes of discussion herein, it is assumed that the beamsplitter 112 is created or provided on surface 111*e* (FIG. 10). In the final optical assembly, components 111 and 113 are typically bonded together using optical cement.

Figure 17:
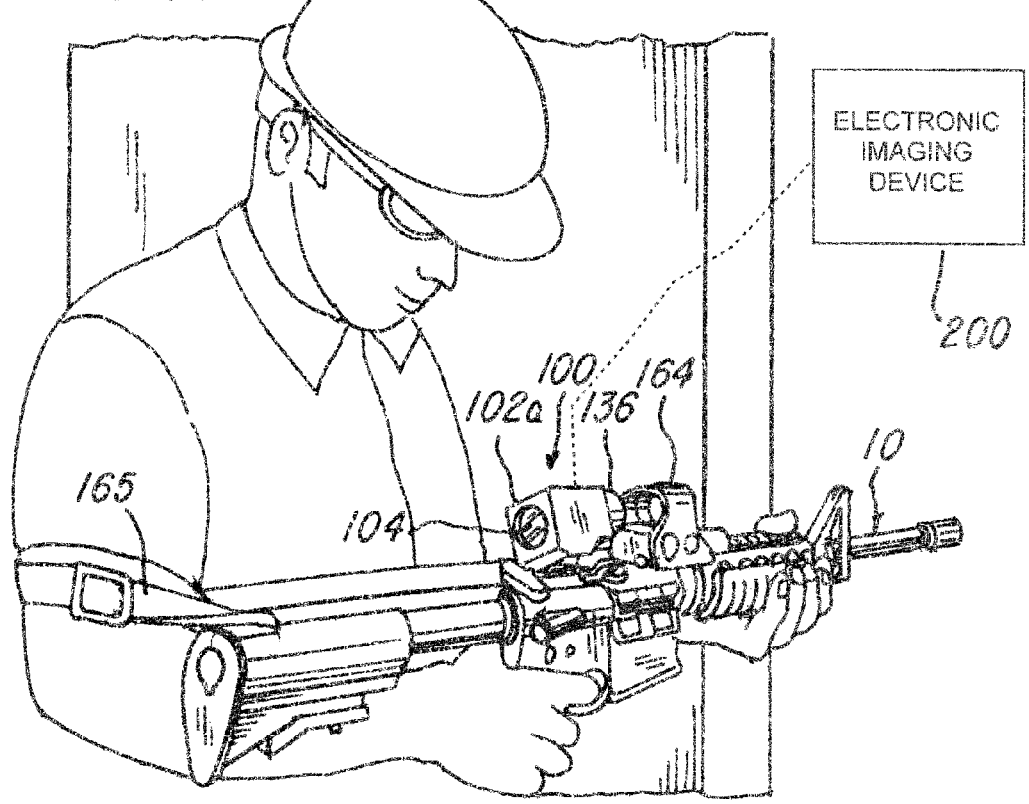
FIG. 17 is a view illustrating a user viewing a target from above the weapon.

It should be understood, however, that the optical assembly 110 may be provided in separate components and assembled or situated in a similar arrangement as shown in FIG. 11. Thus, the optical element 110 may be provided in a single integral construction, as illustrated in FIG. 11, or the optical sub-components of mirror 111*a*, beamsplitter 112 and wedge cap 113 can be design to be mounted into the housing 102 as separate optical components that are placed into area 122 (FIG. 17). In such an alternate embodiment the beamsplitter 112 can be created on the wedge cap surface 113*b* (FIG. 10). The mirror 111 a can be a separate optical component that is secured in the housing. Separate optical window elements at surfaces 104, 105, 106 can also be used to seal the interior housing and optics in such an embodiment.

The complete optical element 110 functions as a non-inverting optical beamsplitter that simultaneously provides non-inverted images of a target T to windows 104 and 106, as will be described in more detail later herein.

The housing 102 is an aluminum housing using a kinematic optical mounting technique. The optical element 110 is received in the area 122 (FIG. 14) and engages mounting pads or areas 120 and 121 that are machined into the housing 110. As shown in FIGS. 7, 11 and 12, note that each locking ring 104-106 has the O-rings 104*a*, 106*a* and 108*a* that engage surfaces 113*a*, 111*c*, and 111*b*, respectively. The locking rings 104, 106 and 108 force penta prism beamsplitter 111 against mounting pads 121 to retain optical element 110 in a firm and secure position within the housing 102. The O-rings 104*a*, 106*a* and 108*a* engage and conform to the surfaces 113*a*, 111*c* and 111*b* to provide a seal so moisture, dirt or unwanted debris will not enter housing 102.

After the optical element 110 is secured within the housing 102, an elastimeric compound or sheet 124 (FIG. 19), such as a neoprene rubber sheet, is situated on surface 111*d* and a lid 130 is secured to housing 102. The compound or sheet 124 is used to provide a watertight seal of the lid 130. The lid 130 is secured to the housing 102 with a plurality of screws 132 (only one of which is shown in FIG. 19 for ease of illustration).

As illustrated in FIGS. 10 and 19, optical element 110 provides paths J and I that are visible to the user at positions 116 and 118, respectively, and that generally correspond to positions associated with the windows W1 (FIG. 19) and W2 (FIG. 19) as shown. Note that the incoming light or optical path Y is received in window W3 (FIG. 19) and is split by beamsplitter 112 at the surface 111*e* of penta prism beamsplitter 111 (FIG. 10). Thus, one component of the light along path Y passes through the prism 111, through beamsplitter 112 and along path or axis J to the user who is situated in proximity to area 116 and near the window W1 associated with locking ring 104 (FIG. 19). This area 116 is generally associated with a rear 102*a* of the housing 102, as illustrated in FIG. 19.

The other component of split beam Y, labeled as I in FIG. 10, is reflected first off of the beamsplitter 112 on surface 111*e* of penta prism beamsplitter 111 and then off a mirrored surface 111*a* of the penta prism beamsplitter 111. The reflected light along path I passes through window W2 associated with the circular locking ring 106 (FIG. 19) and to the user at area 118, which generally corresponds to a side or angled position, such as the positions illustrated in FIGS. 16, 17 and 18. In the angled or side positions, the user may be situated, for example, adjacent to, on a side, above or below the sight 100 so that the user's view is generally transverse or radial relative to the path Y.

As mentioned earlier, the beamsplitter 112 and wedge cap 113 are integrally formed in the penta prism beamsplitter 111 to provide a single, integral optical element 110. It should be understood, however, that the optical element 110 may be constructed or assembled from multiple separate, non-integral components, such as by using one or more of the individual beamsplitter 112, penta prism beamsplitter 111, an individual penta prism (not shown) without a beamsplitter, the wedge 113, windows (not shown), and/or one or more separate mirrors (not shown) situated in the general configuration illustrated.

Although not shown, various surfaces of the components, such as surfaces 111*b* and 111*c* of penta prism beamsplitter 111 and surface 113*a* of wedge cap 113, may be optically coated with an anti-reflection or anti-scratch deposition or coating to enhance the performance or protection of the optical element 110. Notice that the user is viewing the target T through either window W1 or W2 and that these are the surfaces 113*a*, 111*b* and 111*c* of penta prism beamsplitter 111, respectively. Thus, separate lens covers are not necessary, although they may be used if desired.

Referring now to FIG. 10, note that the penta prism beamsplitter 111 and beamsplitter 112 cooperate to receive light along path Y and provide the two optical pathways J and I. Path I is generally transverse to paths Y and J and is situated at a predetermined angle Φ relative to paths Y and J as shown. In the embodiment shown, the predetermined angle Φ is on the order of about 90 degrees, but it should be understood that the optical element 110 incorporating penta prism beamsplitter 111 may be dimensioned and configured so that the relative angle Φ between the optical pathways or axes J and I, for example, is any desired angle. Note that the optical pathway J exits through the window W1 associated with locking ring 104 to the area 116 (FIGS. 10 and 19) generally associated with the area 116 or a rear 102*a* (FIGS. 17 and 19) of the sight 100. The optical pathway I exits through window W2 defined by locking ring 106 and is generally associated with the area 118 (FIGS. 10 and 19), which generally corresponds to a position where a user is situated other than at the rear of the device, such as the side or adjacent positions and above positions illustrated in FIGS. 16-17. Viewing from a rear position of the sight 100 is illustrated in FIG. 18.

Figure 18:
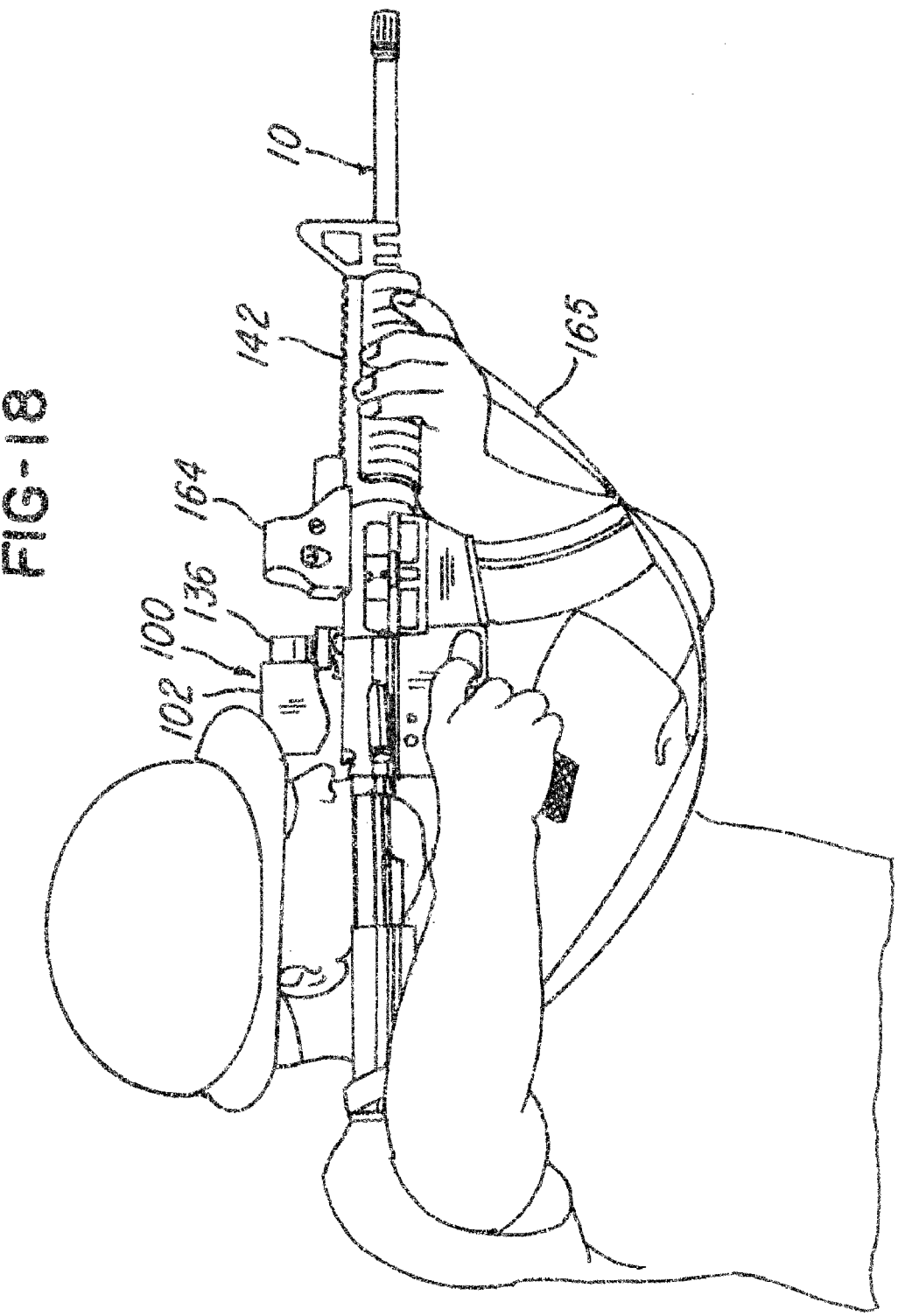
FIG. 18 is a view illustrating a user viewing a target from a rear of the weapon.

As with the embodiment described earlier herein, the optical element 110 enables target viewing from either the side position 118 (illustrated in FIGS. 16 and 17) or the rear position 116 (illustrated in FIG. 18). The beamsplitter 112 split ratio in the embodiment being described is approximately 50/50 so that light is substantially evenly divided between the two optical paths I and J (FIG. 10). It should be understood, however, that other split ratios can be used. Also, coatings, such as mirror and beamsplitter coatings, may be applied to the optical surfaces 111a and 113b, respectively, during manufacturing. Note that axis J is a generally a direct line of sight or view to the target T, whereas the line of sight or axis I is a non-direct line of sight to the target T, as illustrated in FIG. 10.

In the example being described, the wedge cap 113 (FIG. 10) may be provided to support and protect the beamsplitter 112. The wedge cap 113 (FIG. 10) also provides an air to glass surface 113a (FIG. 10) that is generally normal to the axes or line of sight J and Y illustrated in FIG. 10. As mentioned earlier, one or more component surfaces, such as the surfaces 111a, 111b, 111c, 111e of prism 111, and/or surfaces 113b, 113a of wedge 113, may comprise an anti-reflection coating or filter to reduce unwanted light reflections or light (such as UV light).

As best illustrated in FIGS. 7, 11, 13 and 19, the sight 100 further includes a connector assembly or connector 134 that is coupled to the housing 102 and permits the housing 102, optical element 110, and windows W1, W2 and W3 to rotate or pivot about an axis A2 (FIG. 19). This enables, for example, the position of window W2 to be changed relative to axis A2.

The connector assembly 134 comprises a circular portion 136 that is mounted on a conventional quick-release mount 138. In the embodiment being described, the quick-release mount 138 comprises a lever 140 (FIG. 8) that may be manually actuated to quickly and detachably release the connector 134 from a rail or track, such as the track 142 (FIG. 15), on which a scope 164 is mounted. The housing 102 is rotatably mounted to the connector 134 in a manner that will now be described.

The connector 134 comprises an internal circular sleeve or plug 144 (FIG. 19). A plastic bearing 146 (FIGS. 13 and 19) is received on plug 144 and is situated between a wall 136a (FIG. 13) of circular portion 136 and a flange wall 144b of a flange 144c of plug 144. Another bearing 148 is situated on a seat 144e and engages surface 144d of flange 144c. A washer 150 is situated between the bearing 148 and a locking ring 152 as shown. The locking ring 152 is threadably received in the threaded aperture 136b of circular portion 136 to rotatably retain the plug 144 and the various components, such as the plug 144, bearings 144, 148 and washer 150 within the connector 134.

As illustrated in FIGS. 11 and 13, the threaded portion 144f of plug 144 projects through the opening 136b (FIG. 13) of circular portion 136. Note that the plug 144 is free to rotate between the bearings 146 and 148 within connector 134 and about the axis A2. The threaded portion 144f threadably receives the threads 109 of housing 102, thereby connecting the housing 102 to the rotatable plug 144 as shown.

Because the plug 144 is not fixed and is free to rotate within circular portion 136 about the axis A2 (FIGS. 13 and 19), the housing 102 is also free to rotate. An set screw, such as set screw 160 (FIG. 11), is mounted through housing 102 and into the threaded aperture 162 in order to lock or fix the housing 102 relative to the rotatable plug 134. Thus, the plug 144 is coupled to and permits or enables the housing 102 to rotate about the axis A2, which generally corresponds to an axis or direct line of sight to the target T. This means that the position of the optical element 110 and the position of the window W2 associated with locking ring 106 is also capable of pivoting or rotating about the axis A2, which generally corresponds to the direct line of sight to the target T when viewed through the window W1 associated with locking ring 104.

After the system 100 is assembled and the housing 102 is coupled to the connector 134, the sight 100 may be detachably mounted to the track 142 (FIG. 15) using the quick-release disconnect mount 138. The quick-release disconnect mount 138 may be any conventional mount, such as the Picatinny Rail 1913 mount or any equivalent thereof. In the embodiment being described, the sight 100 is not mounted directly to the scope 164 (FIG. 15), but rather, is situated a predetermined distance GD behind the scope as desired by the user to optimizing viewing geometry and satisfy mounting constraints.

In the embodiment being described, the optical element 110 has zero optical power and an unlimited eye relief and does not magnify the target scene (FIG. 10). This is desirable when the sight 100 is mounted on the weapon and interfaced to a unity optical power scope, such as a 1× rifle scope, with a similar unlimited eye relief. The embodiment is designed to work efficiently in combination with various unity magnification rifle scopes with red dot or holographic reticles. Representative examples of such rifle scopes are shown in U.S. Pat. Nos. 4,346,995; 5,189,555; and 6,490,060, all of which are incorporated herein by reference and made a part hereof.

In the embodiment being described, the system 100 can be used and interfaced with-riflescopes or to a conventional rear peep sight (not shown) to provide a reticle (not shown) or it may be provided with its own reticle (not shown), such as a laser or red dot or holographic reticle. One advantage of the invention is that there is no need to adjust eye relief using additional lenses in the embodiment because unity optical devices allows for unlimited eye relief. However, to support magnified viewing of target scene T from the rear and/or side ports or windows W1 and W2, respectively, optical lenses or mirrors could be incorporated or used to correctly position the eye pupil to a fixed user eye point location in each optical path.

Also, additional imaging objects incorporating a reticle, magnification, night vision, windage and elevation adjustment units and/or an electronic imaging device 200, such as the digital camera referred to earlier herein relative to the first example, may be used to provide for precise imaging and aiming at the target T. As with the embodiment being described earlier herein relative to FIGS. 1-6, this embodiment is also designed to work efficiently in combination with unity magnification scopes having, for example, laser, red dot or holographic reticle. Also, electronic imaging devices (FIG. 17), such as a digital camera, may be substituted for the eye and associated with one or more of the windows 104-108 if desired. The invention may be used or incorporate night vision and/or laser sighting system capabilities as well. It should be understood, that additional lenses and optics can be incorporated into the optical housing 102, the windows 104-108 to support magnified viewing of the target scene T and to properly adjust exit pupil and focal distances. Also, additional imaging objects such as a reticle, magnification, laser sighting, range finding, night vision, windage and elevation adjustment units and/or an electronic imaging device may be integrated directly into the invention to provide a multifunctional device with extended capability.

As illustrated in FIGS. 8, 9 and 6-18, rotational adjustment of the optical element 110 is accomplished by a user simply adjusting the position of the housing 102 in the direction of double arrow H in FIG. 9. Thus, the user can position the window W2 to the desired viewing position, such as the side position shown in FIG. 16 or the above-sight position illustrated in FIG. 17. In this regard, as the user rotates the housing 102, the plug 144 (FIGS. 7 and 11) to which it is coupled rotates within the circular portion 136 of connector 134. While the bearings 146 and 148 permit this rotational movement, the locking ring 152 is tightened to a predetermined torque such that the housing 102 is retained in the position selected by the user. Although not shown, a lock may also be provided to lock the housing 102 relative to the connector 134 after the user has adjusted it to the desired position.

Figure 16:
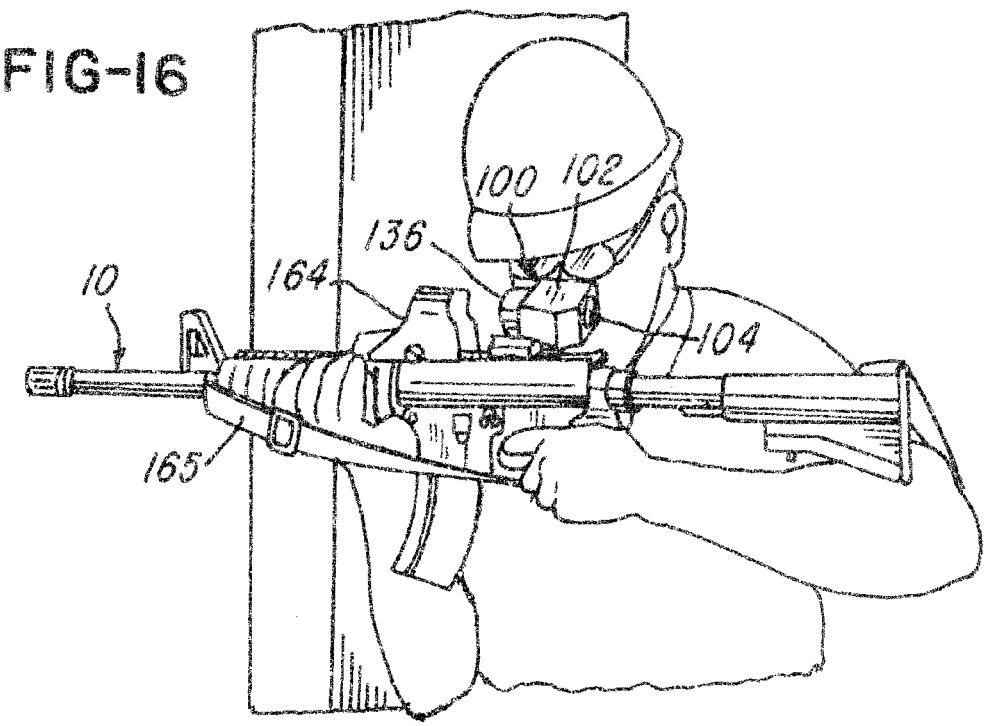
FIG. 16 is a view illustrating a user viewing a target utilizing the embodiment shown in FIG. 7.

During operation, the user views the target T through either the window W1 or window W2. Light passes along path Y (FIG. 10), through the window W3, and the optical path Y (FIG. 10) is split into the axes or paths J and I at the surface 111e as described earlier. The component J of the light passes through the window W1 and to the area 116 if, for example, the user is viewing the target T from the rear of the sight 100, as illustrated in FIG. 18. As secondary reflection of the incoming light is reflected off surface 111e (FIG. 10) and off mirror surface 111a before passing through the window W2 and to the area 118 generally associated with a side or non-rear position of the weapon 10, as illustrated in FIGS. 16 and 17. Note that the secondary reflection off of mirrored surface 111a eliminates the inversion that occurs when the incoming light is reflected off surface 111e (FIG. 10). Thus, the sight 100 provides non-inverted images of the target T when viewed through the windows W1 and W2, respectively.

As alluded to earlier herein, the locking rings 104, 106 and 108 have no additional lenses, optical features or windows. However, it should be understood that these openings or windows 104-108 may also contain other optics or lenses depending upon the specific imaging requirements of the sight 100 and the environment in which it is being used. Also, the sight may be detachably mounted to weapon 10 or provided in a storage pouch (not shown) for quick retrieval and mounting when desired. Also, in view of the various positions that may be achieved using the sight 100, a sling 165 (FIGS. 16-18) may be provided and used to stabilize the weapon 10 and sight 100 during shooting. The sling 165 facilitates minimizing the need for the user to support and stabilize the weapon 10 and helps to absorb the recoil energy during firing.

Advantageously, the position of housing 102 is adjustable and the position of the window W2 can be adjusted, pivoted or rotated about the center line or axis A2 (FIG. 19) or the pointing axis of the sight 100 so that the target T can be viewed through the window 106 at a plurality of non-rear positions, side positions, off-axis positions, above or below sight positions or any position in the direction of double arrow H (FIG. 9), while approximately maintaining angle Φ (FIG. 10). Note that the user maintains the ability to see the target T through the rear window W1 associated with locking ring 104 at any time. Thus, it should be appreciated that when the sight 100 is mounted on the weapon 10, the user can view target T down the target line, as shown in FIG. 18, or from a non-rear, side, above or below weapon 10 position which are forward of the rear position, such as when the user is pointing the weapon at the target T while the user himself is positioned above or below a protective barrier, such as a wall of a building.

While the invention has been described with reference to certain specific embodiments, this description is merely illustrative, and is not to be construed as limiting the scope of the invention. Various other modifications and changes may occur to those skilled in the art without departing from the spirit and scope of the invention as defined by the appended claims.

What is claimed is:

1. A weapon comprising:
   a firearm for firing bullets at a target;
   a sight comprising:
      a connector for mounting the sight to the firearm;
      a housing coupled to said connector, said housing having a first window and a second window generally opposing said first window at another end of said housing and a third window, said first and second windows adapted to provide a line-of-sight view of said target along a line-of-sight axis and said third window permitting a side view from said housing of said target along a side axis; and
      an optical element situated in the housing for receiving a beam in said first window and for splitting said beam into a plurality of optical paths so that said target can be viewed by the user along said line-of-sight axis through said second window or along said side axis through said third window, said second window providing a direct line of sight to said target, wherein said optical element comprises a penta prism beam splitter;
   wherein said connector is adapted to pivotably mount the housing to the weapon, other sight or pointing device such that after mounting, said third window pivots or moves along an arc about said line-of-sight axis to permit a position of said third window to be changed so that a user can view the target from a plurality of positions along said arc;
   said side axis being non-parallel to said line-of-sight axis and said third window having a lens or window surface that is open to atmosphere so that a user may look directly through said third window and view the target along said side axis.

2. An optical sight for use on a weapon, said optical sight comprising:
   a housing comprising a first window and a second window generally opposed to the first window, and a third window, said first and second windows adapted to provide a line-of-sight view of a target along a line-of-sight axis and said third window permitting a side view from said housing of said target along a side axis;
   an optical element, said optical element being in operative relationship with the first, second and third windows, the optical element comprising one beamsplitter, and at least one mirrored surface allowing a non-inverted image of the target through the second and third windows, wherein said optical element comprises a penta prism beam splitter; and
   a connector for detachably coupling the housing in operative relationship with a scope, wherein said connector is adapted to pivotably mount the housing to the weapon such that after mounting, said third window may pivot or move along an arc about said line-of-sight axis to permit a position of said third window to be changed so that the user can view the target from a plurality of positions along said arc;
   said side axis being non-parallel to said line-of-sight axis and said third window having a lens or window surface that is open to atmosphere so that a user may look directly through said third window and view the target along said side axis.

3. The sight as recited in claim 2 wherein said line-of-sight axis is generally coaxial with an axis of said sight.

4. The sight as recited in claim 2 wherein said side axis is not coaxial with an axis of said sight.

5. The sight as recited in claim 2 wherein said second window is situated at an end of said sight to permit direct observation of said target and said third window is situated on a side of said housing to permit observation of said target from a position displaced from a direct line of sight.

6. The sight as recited in claim 2 wherein said third window enables a side angle view of said target along said side axis, said third window being adjustable to permit said side angle view from a plurality of different positions; and
 wherein at least a portion of said housing is rotatable about a direct sight axis in order to permit said at least one of said first, second or third windows to rotate so that said target may be viewed at said plurality of different positions.

7. The sight as recited in claim 2 wherein said optical element permits a non-inverted image of said target from each of said second or third windows.

8. The sight as recited in claim 2 wherein said connector comprises a quick release mount.

9. The sight as recited in claim 2 wherein said optical element provides a non-inverted view of said target when observed through a plurality of said second or third windows.

\* \* \* \* \*